US012496748B2

(12) United States Patent
Wlasow Wlasowski et al.

(10) Patent No.: US 12,496,748 B2
(45) Date of Patent: Dec. 16, 2025

(54) GEOMETRY OF A LAY-UP SURFACE

(71) Applicant: SAFRAN AERO BOOSTERS, Herstal (BE)

(72) Inventors: Michel Wlasow Wlasowski, Herstal (BE); Julien Philippe Gallet, Herstal (BE)

(73) Assignee: SAFRAN AERO BOOSTERS, Herstal (BE)

( * ) Notice: Subject to any disclaimer, the term of this patent is extended or adjusted under 35 U.S.C. 154(b) by 0 days.

(21) Appl. No.: 19/100,007

(22) PCT Filed: Aug. 1, 2023

(86) PCT No.: PCT/EP2023/071227
§ 371 (c)(1),
(2) Date: Jan. 30, 2025

(87) PCT Pub. No.: WO2024/028290
PCT Pub. Date: Feb. 8, 2024

(65) Prior Publication Data
US 2025/0256431 A1 Aug. 14, 2025

(30) Foreign Application Priority Data
Aug. 1, 2022 (BE) .................................. 2022/5607

(51) Int. Cl.
*B29B 11/16* (2006.01)
*B29C 70/38* (2006.01)

(52) U.S. Cl.
CPC ............ *B29B 11/16* (2013.01); *B29C 70/382* (2013.01)

(58) Field of Classification Search
CPC ...................................................... B29B 11/16
See application file for complete search history.

(56) References Cited

U.S. PATENT DOCUMENTS

2015/0174833 A1 6/2015 Desjoyeaux
2019/0168419 A1 6/2019 Provost et al.

FOREIGN PATENT DOCUMENTS

CN    112638611 A    4/2021
CN    114375251 A    4/2022
(Continued)

OTHER PUBLICATIONS

Written Opinion of the International Searching Authority as issued in International Patent Application No. PCT/EP2023/071227, dated Nov. 14, 2023.
(Continued)

*Primary Examiner* — Jeffry H Aftergut
(74) *Attorney, Agent, or Firm* — Pillsbury Winthrop Shaw Pittman LLP

(57) ABSTRACT

A method for determining a draping geometry for producing a composite material part including a body being a volume of revolution with an axis directed along an axial direction having a given reference radius, the body extending around the axial direction along a circumferential direction, and a flange extending from one end of the body along a direction of extension, the method including determining a first surface having a radius smaller than the reference radius, and determining a second surface located in the extension of the first surface, the second surface having circumferential corrugation curves in the circumferential direction and in the direction of extension.

10 Claims, 11 Drawing Sheets

(56) References Cited

FOREIGN PATENT DOCUMENTS

| FR | 2995557 A1 | * | 3/2014 | ............. B29C 70/40 |
|----|------------|---|--------|--------------------------|
| FR | 3 062 336 B1 | | 8/2018 | |
| GB | 2484349 A | * | 4/2012 | |
| GB | 2484350 A | * | 4/2012 | |
| GB | 2 486 230 A | | 6/2012 | |
| WO | WO 2012/046020 A1 | | 4/2012 | |
| WO | WO 2018/007756 A1 | | 1/2018 | |
| WO | WO-2019030462 A1 | * | 2/2019 | ............... F02K 1/48 |

OTHER PUBLICATIONS

International Search Report as issued in International Patent Application No. PCT/EP2023/071227, dated Nov. 14, 2023.
First Office Action as issued in Chinese Patent Application No. 202380065687.4, dated Jun. 14, 2025.

* cited by examiner

[Fig. 1]
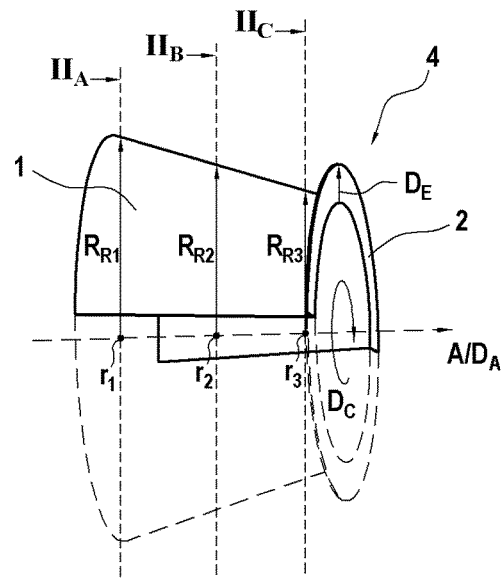
[Fig. 2A]
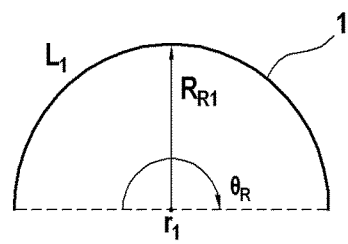
[Fig. 2B]
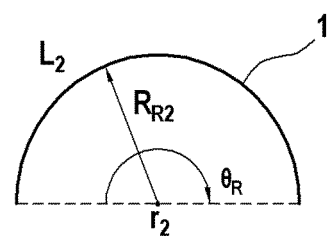
[Fig. 2C]
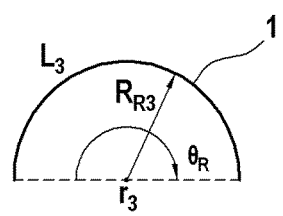

[Fig. 3]
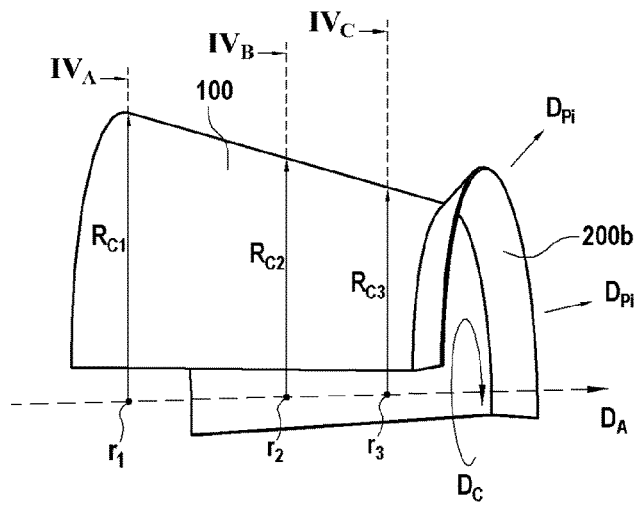
[Fig. 4A]
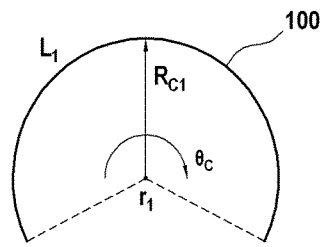
[Fig. 4B]
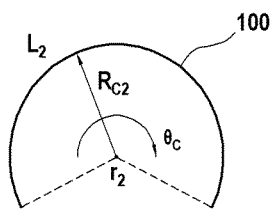
[Fig. 4C]
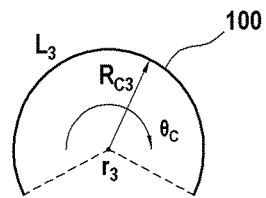

[Fig. 5]
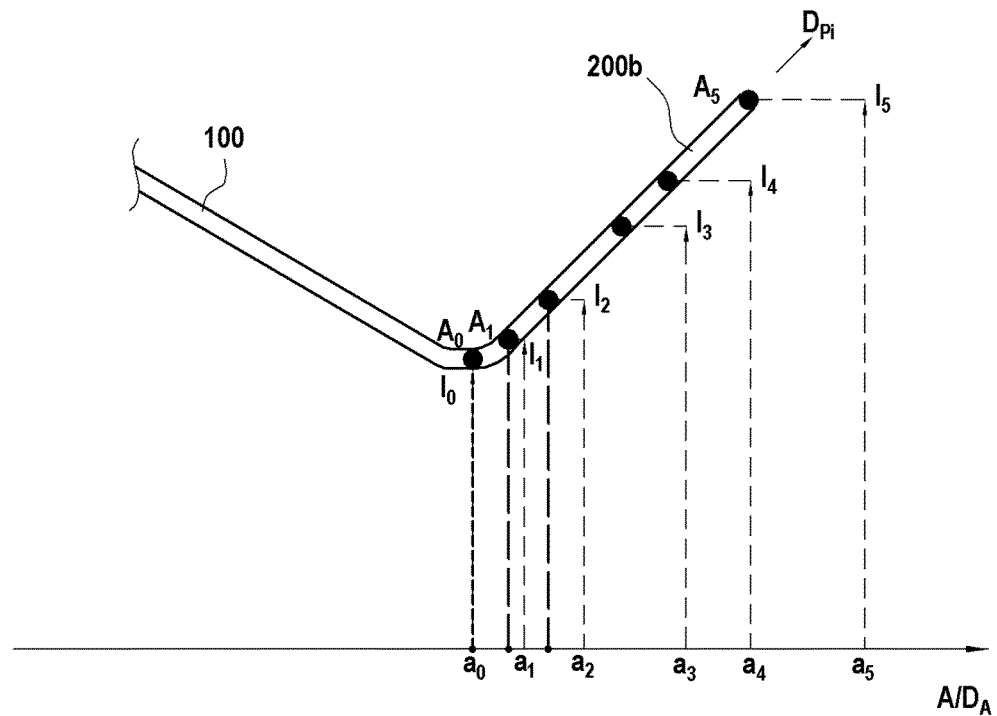
[Fig. 6]
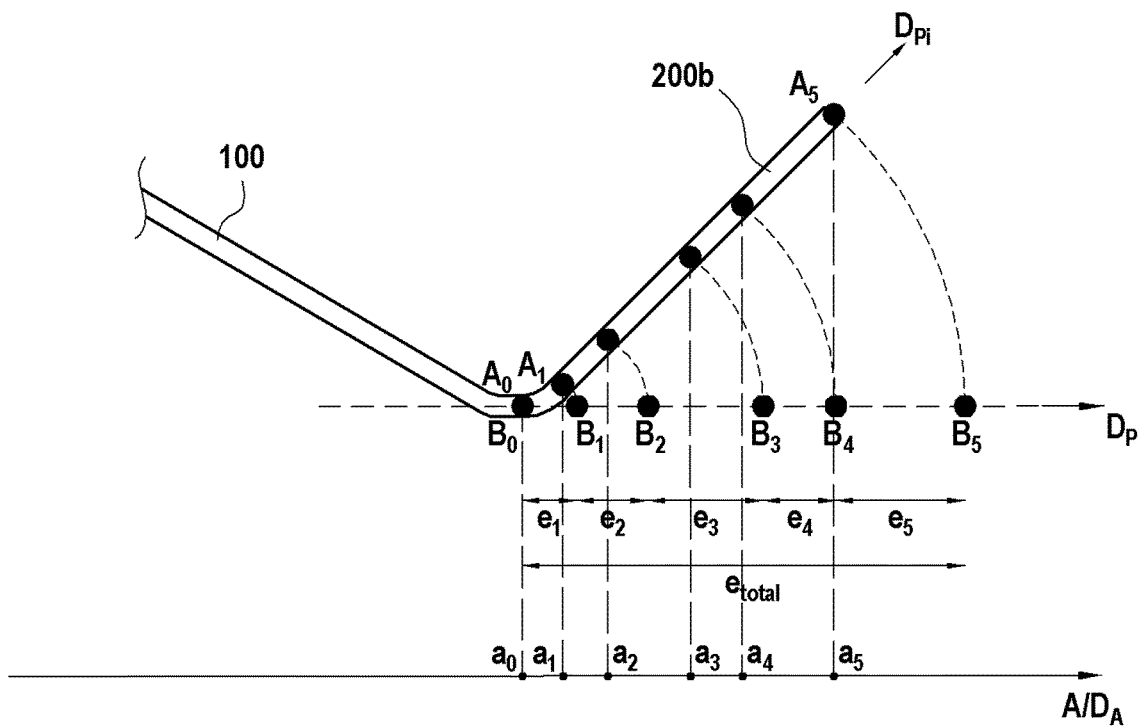

[Fig. 7]
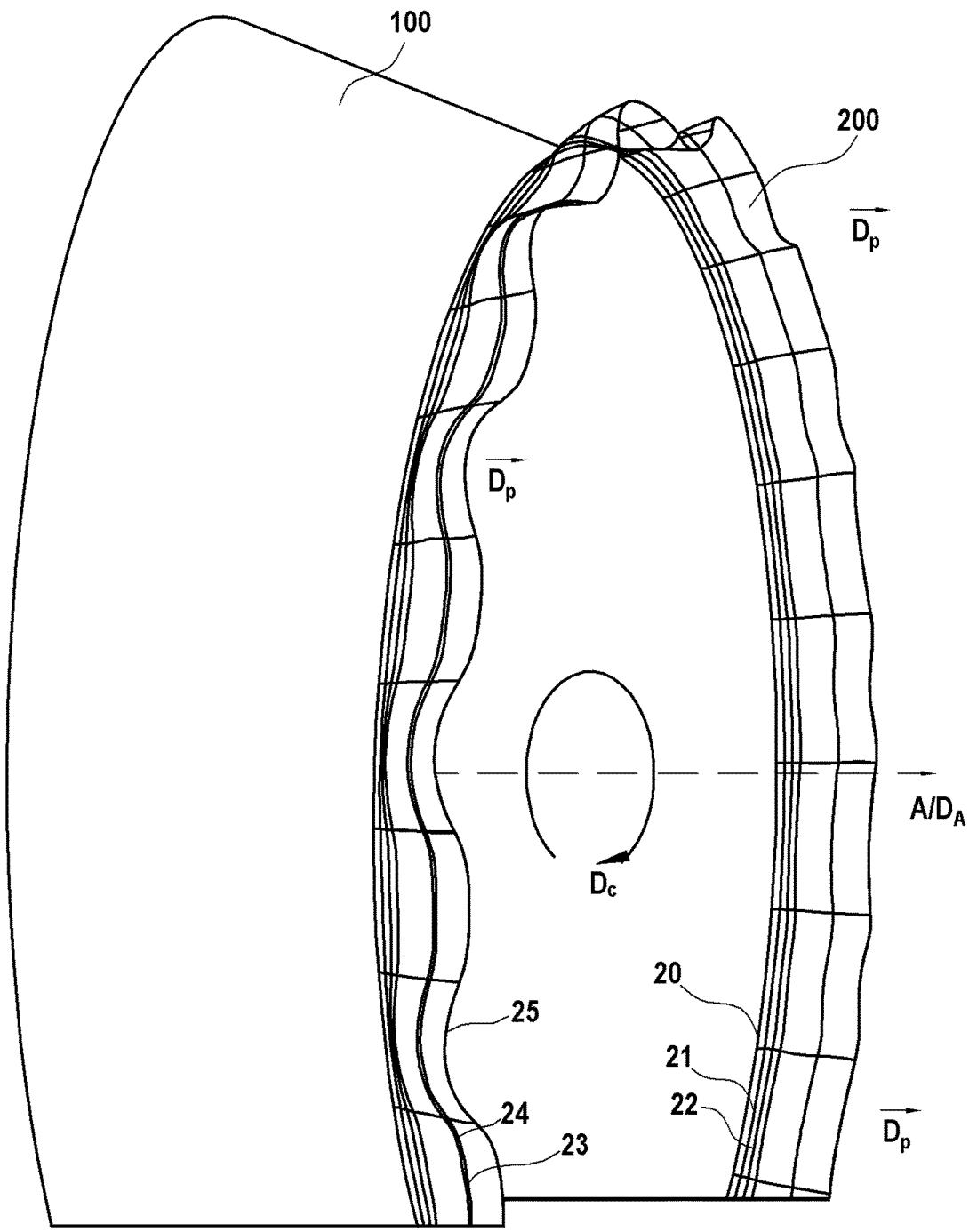

[Fig. 8]
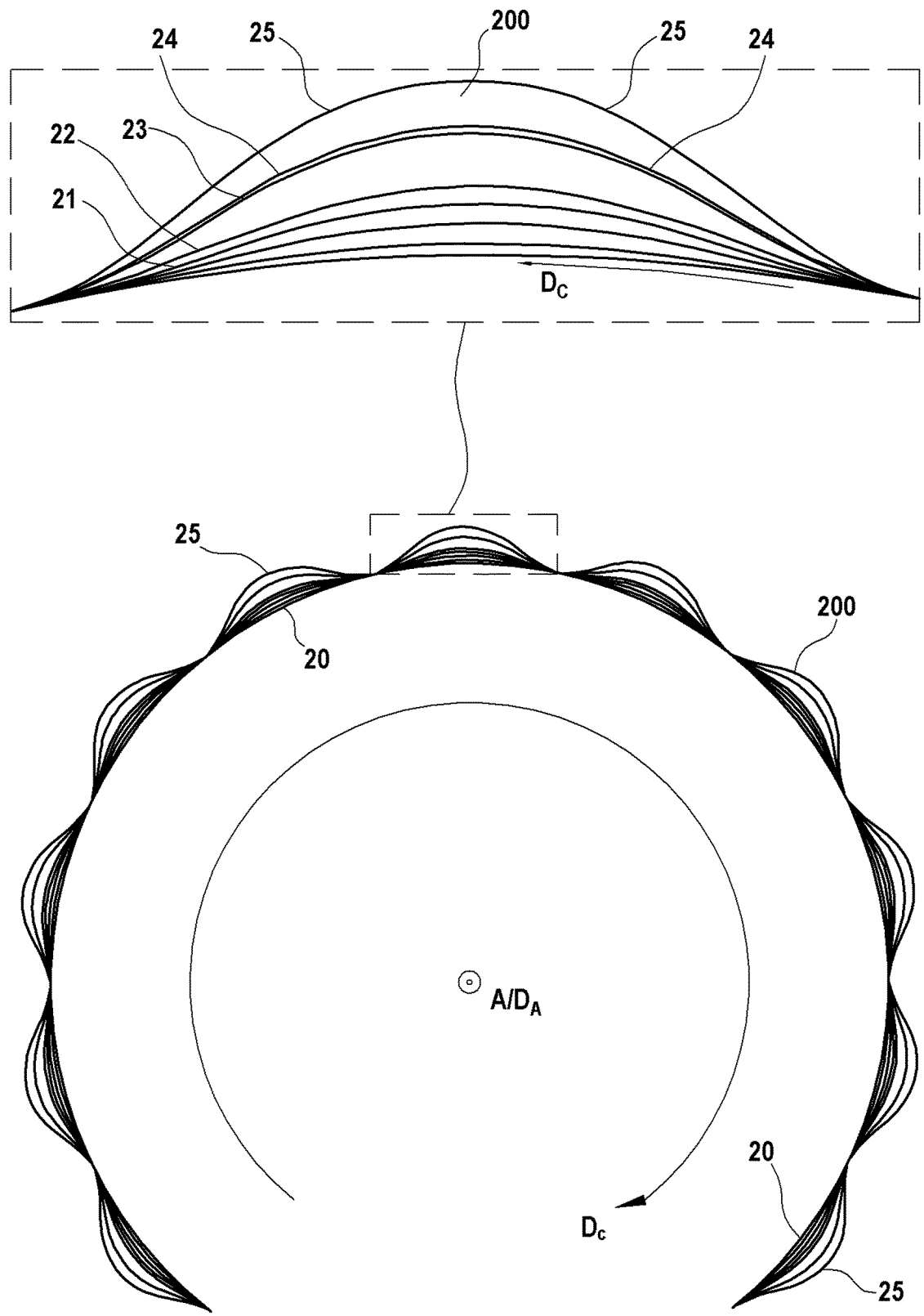

[Fig. 9]
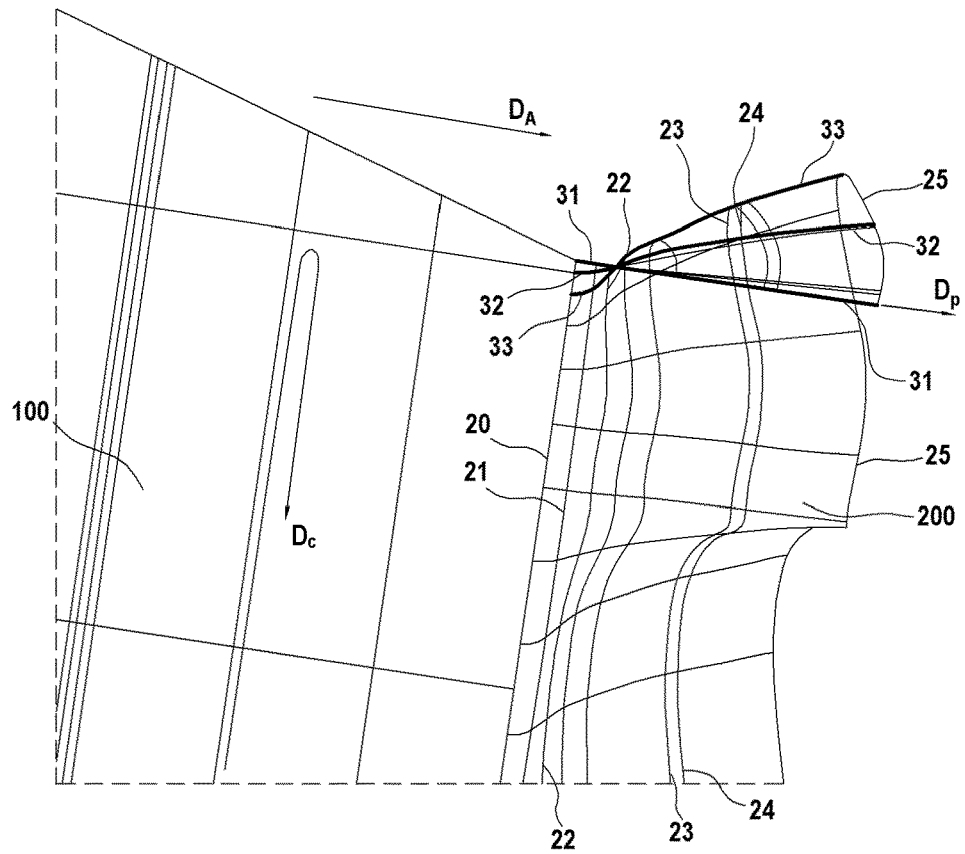
[Fig. 10]
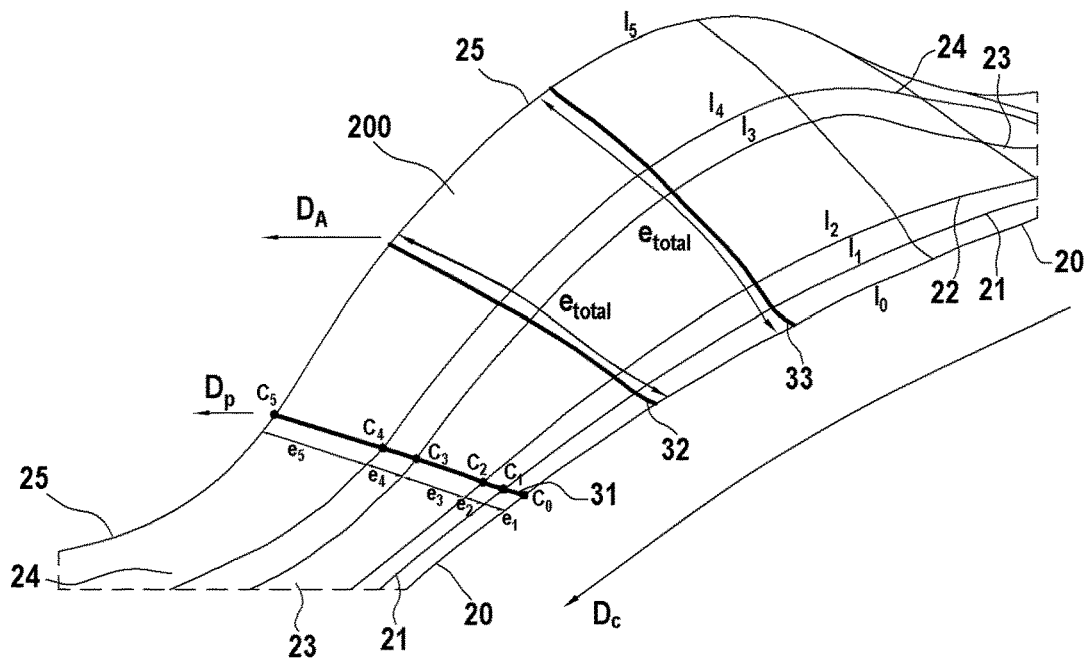

[Fig. 11]
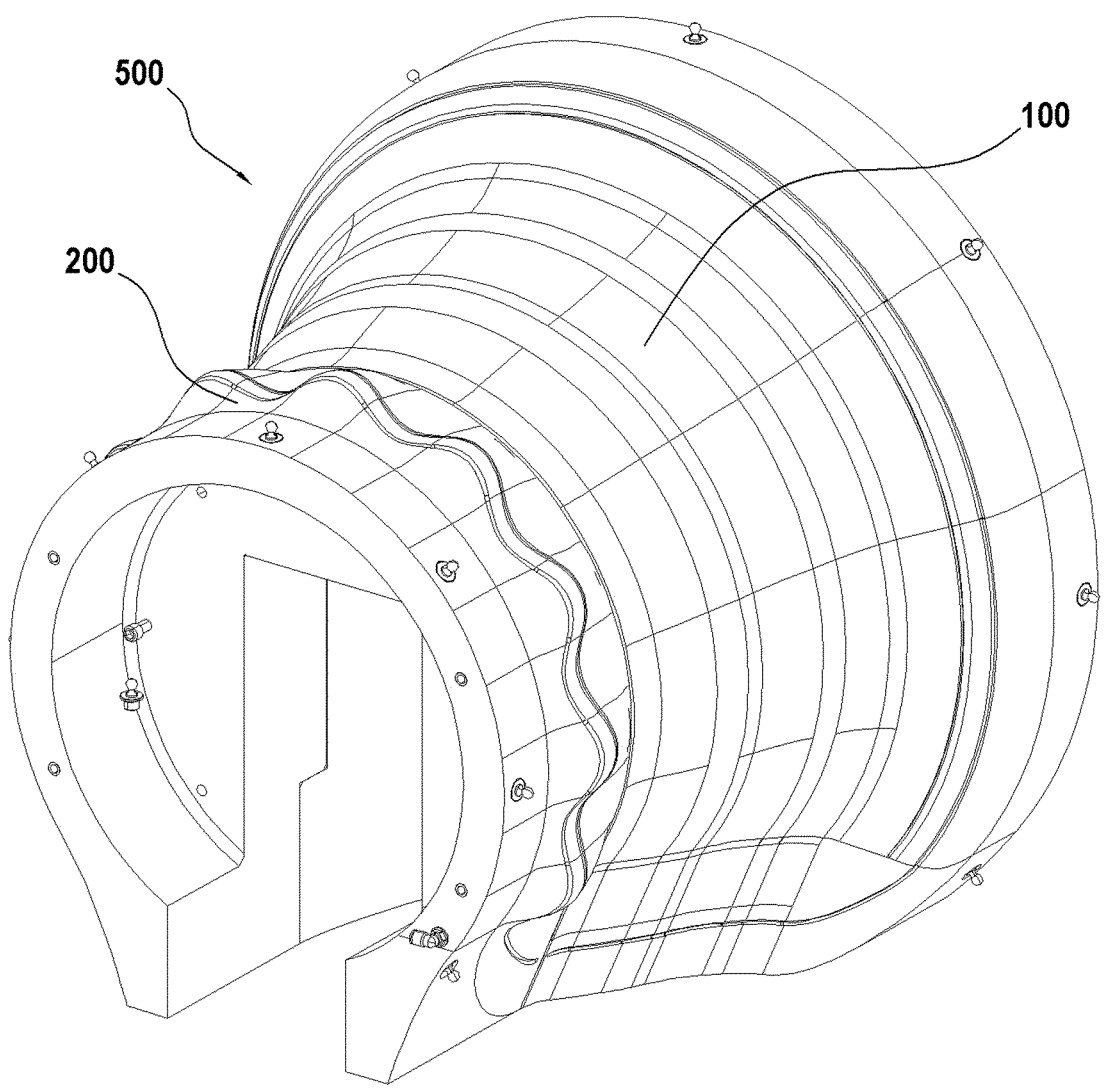

[Fig. 12]
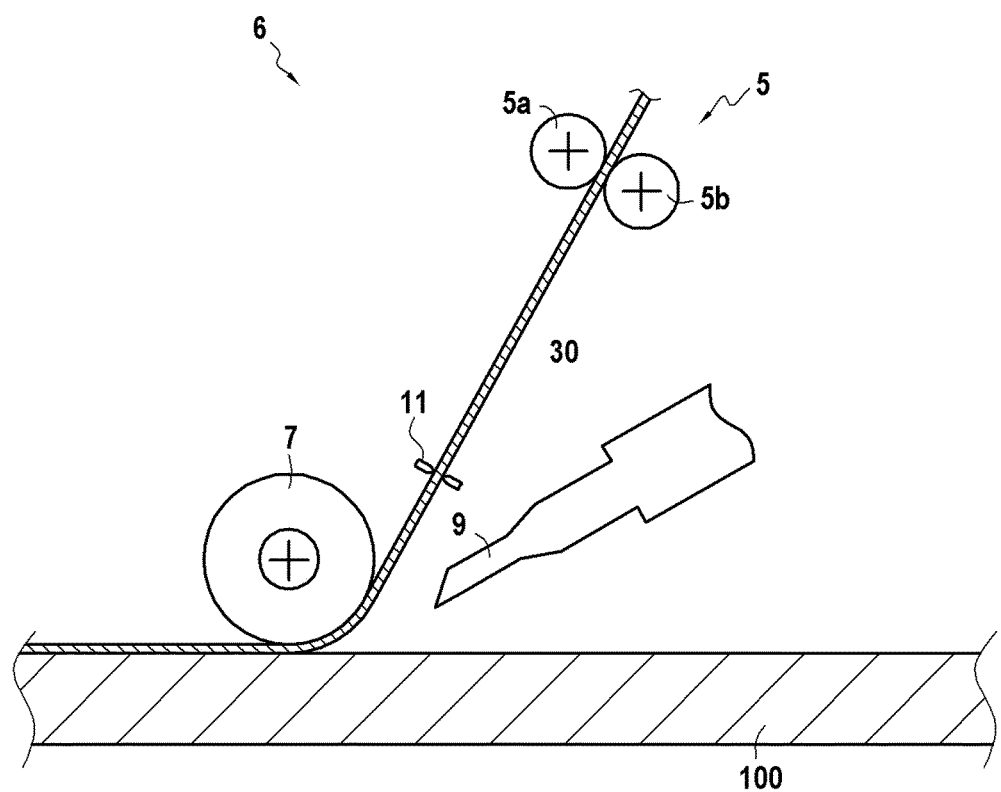

[Fig. 13]
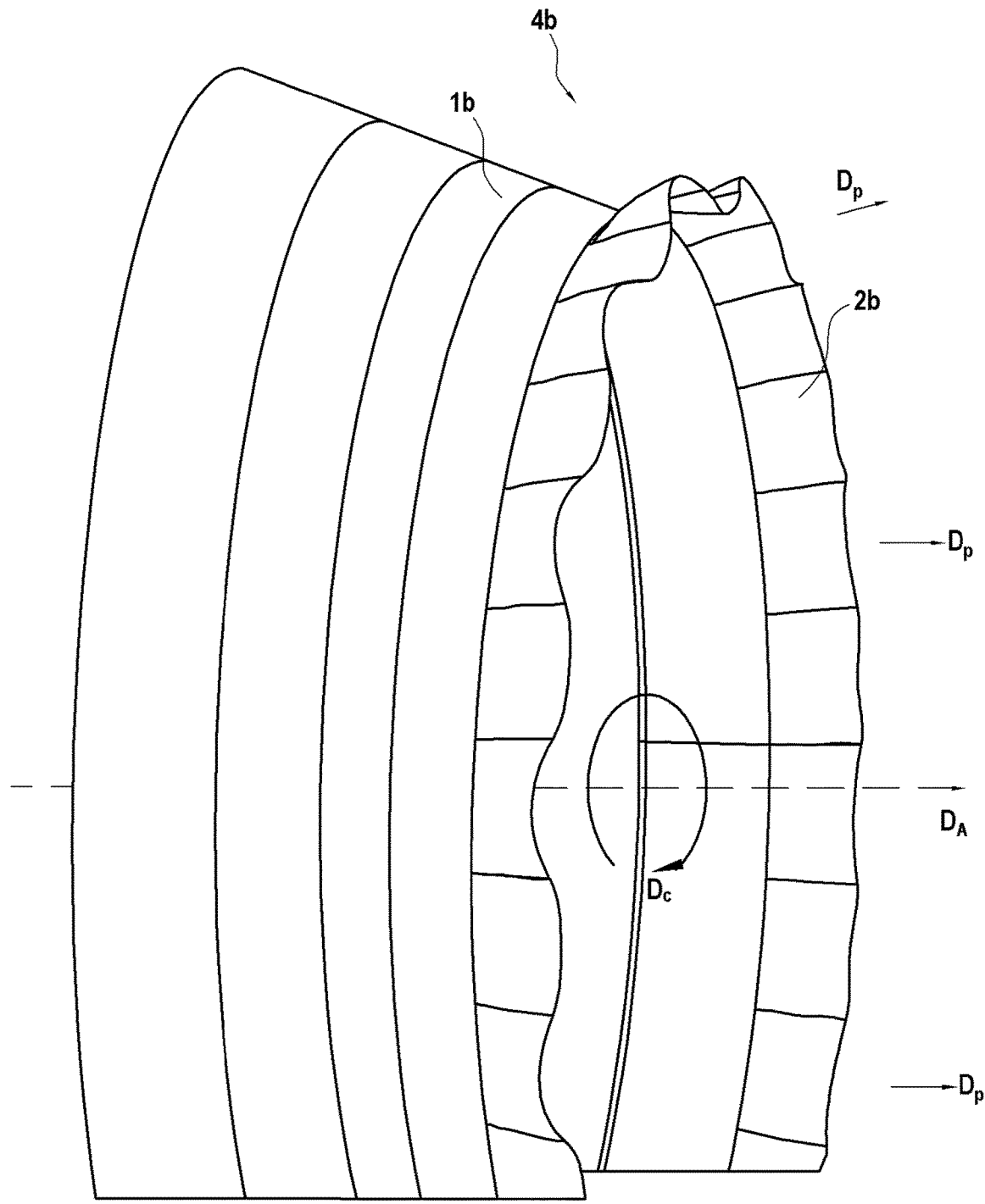

[Fig. 14]
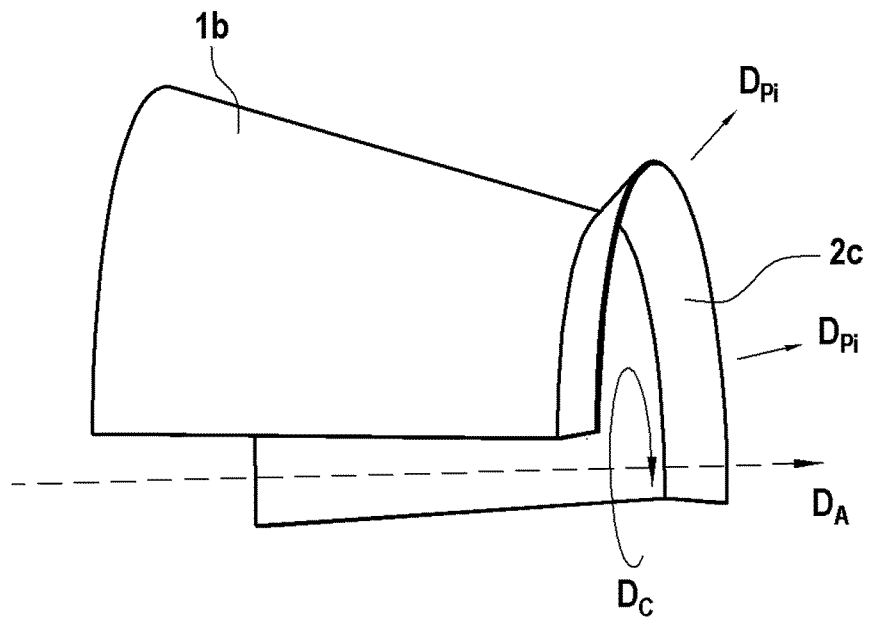
[Fig. 15]
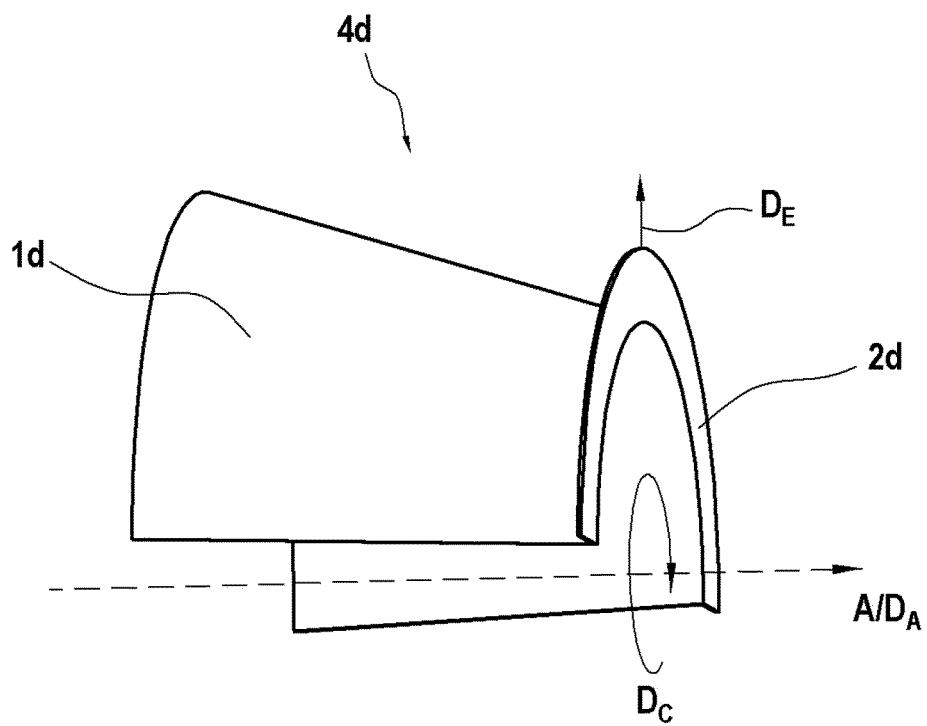

[Fig. 16]
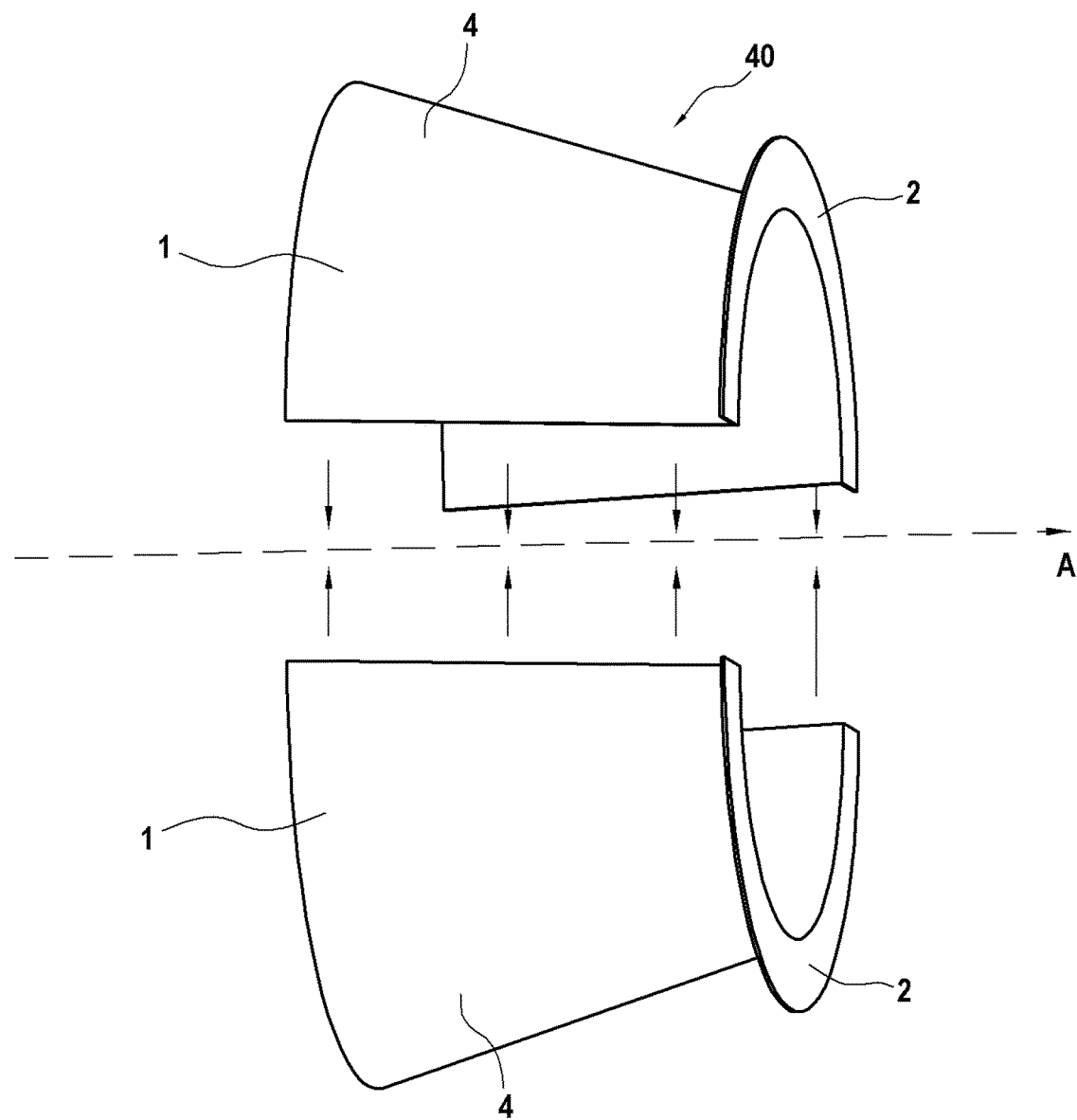

GEOMETRY OF A LAY-UP SURFACE

CROSS-REFERENCE TO RELATED APPLICATIONS

This application is the U.S. National Stage of PCT/EP2023/071227, filed Aug. 1, 2023, which in turn claims priority to Belgium patent application number BE2022/5607 filed Aug. 1, 2022. The content of these applications are incorporated herein by reference in their entireties.

TECHNICAL FIELD

The present invention relates to the manufacture of composite material parts by draping on a surface. Particularly, but not exclusively, the invention relates to the manufacture of aeronautical engine casings.

PRIOR ART

The use of composite materials for the manufacture of aeronautical parts, for example for aeronautical engine casings, makes it possible to obtain resistant parts having mechanical performances equivalent to or even higher than those made of metal, while having a much lower mass.

It is known to produce composite material parts by draping on a surface of pre-impregnated fibrous structures. For reasons of production costs and repeatability, the draping can be carried out automatically, according to the automatic fiber placement (AFP) technique. One example of a method for manufacturing a composite material part using the "AFP" method is for example described in document FR3062336B1.

However, when it is desired to produce parts comprising a body of partial revolution at the end(s) of which flanges extend, with a restricted angle between the body and at least one flange, particularly an acute angle of 90° or less, the head or the roller for depositing the fibrous structures does not allow access to the bottom of said angle.

Thus, to produce parts having such angles, the draping is carried out with angles of greater amplitude to allow the passage of the deposition head or roller, then the structure produced by draping is deformed to obtain the desired angles. Such solutions are for example described in documents WO 2018/007756 and WO2012/046020.

In document WO 2018/007756, in order to produce a final part comprising a flange and a half-shell-shaped body having a given final radius, a half-shell-shaped intermediate preform having a smaller radius than the final radius to be obtained is first draped, and consequently a larger angle between the body and the flange, which makes it possible to carry out the draping of said angle. When the draping is complete, the intermediate preform thus obtained is deformed at the desired final radius, thereby deforming the flange so as to obtain the desired angle between the flange and the body.

In document WO2012/046020, a part comprising a cylindrical body and a circular flange extending perpendicularly to the cylindrical body is produced. The draping is carried out by draping the portion intended to form the flange in the extension of the draping of the portion intended to form the cylindrical body. Then, the portion intended to form the flange is deformed in order to be placed perpendicularly to the axis of revolution of the body. The portion intended to form the flange during the draping has circumferential corrugations of greater amplitude as getting closer to the free end of said portion, so as to obtain a smooth flange after deformation.

However, in the solutions described, the mechanical deformation of the draped structure leads to deformations of the draped fibrous structures and significant stresses in the fibers, particularly in the vicinity of the apex of the angle. These deformations are all the more accentuated when a fillet is present between the flange and the body, or when the angle between the flange and the body is less than 90°.

DISCLOSURE OF THE INVENTION

The present invention aims to overcome the aforementioned drawbacks. For this purpose, the present invention proposes a method for determining a geometry of a draping mold for producing a blank of a composite material part, said part comprising a body of partial revolution with an axis directed along an axial direction and having one or more reference radii given along said axial direction, said body extending partially around the axial direction along a circumferential direction, and said part comprising at least one flange extending from one end of the body along a direction of extension, the method comprising:

determining a first surface of revolution with an axis directed in the axial direction, said first surface extending around the axial direction in the circumferential direction, determining a second surface located in the extension of the first surface along a direction of extension, the angle formed between the axial direction and the direction of extension being greater than the angle formed between the axial direction and the direction of extension, the second surface having corrugation curves in the circumferential direction successively following each other in the direction of extension, each circumferential corrugation curve corresponding to a circular arc belonging to the flange to be produced, the curvilinear length of said corrugation curve corresponding to the length of said circular arc, the method being characterized in that the radius or radii presented by the first surface of revolution along the axial direction is/are smaller than the reference radius or radii for the same position along the axial direction, said first surface corresponding to a curvature in the circumferential direction of a surface having the shape of the body to be produced, and in that the second surface has correction curvatures in the direction of extension, so that all the points of each circumferential corrugation curve are at the same curvilinear distance from the junction between the first surface and the second surface, said curvilinear distance belonging to the second surface and having a value corresponding to the curvilinear distance between the circular arc belonging to the flange to be produced corresponding to said circumferential corrugation curve, and the junction between the flange and the body to be produced.

The first surface is intended to be the draping surface on which the blank of the body of the part to be produced will be draped. The second surface is intended to be the draping surface on which the blank of the flange of the part to be produced will be draped.

The angle formed between the axial direction and another direction is to be understood as the angle directed from the body or from the surface corresponding to the body towards the flange or the surface corresponding to the flange, said angle being measured from the part of the axial direction located on the side of the body or of the surface corresponding to the body towards the part of said other closest direction.

The curvilinear distance or length between a point on a curve of circumferential corrugations and the junction between the first surface and the second surface is defined as the smallest curvilinear distance belonging to the second surface and making it possible to join said point on the curve of circumferential corrugations to said junction.

The curvilinear distance or length between a circular arc and the junction between the flange and the body is defined as the smallest curvilinear distance belonging to the flange and making it possible to join a point on the circular arc to said junction.

Thus, by making correction curvatures in the direction of extension, the stresses in the fibers are limited following the shaping of the draped blank to obtain the preform of the part. Indeed, the circumferential corrugations generate length deficits in the direction of extension, which are rectified using the correction curvatures. Furthermore, the determination of different curvilinear lengths between the circular arcs belonging to the flange and the junction between the flange and the body makes it possible to take into account the radius of a possible fillet between said flange and said body from the design of the mold. Thus, when shaping the draped blank to obtain the preform of the part, the tensions in the fibers at the location of said fillet are limited.

Moreover, by producing a first draping surface for the body blank having a radius smaller than the radius of the body to be manufactured, the angle between the first surface and the second surface intended for the flange blank is further increased, which further facilitates the passage of the draping head and the application of the fibrous structures at the junction between the first surface and the second surface.

According to one particular characteristic of the invention, the inflection points of each circumferential corrugation curve are comprised in the same circle.

According to another particular characteristic of the invention, the minima of each circumferential corrugation curve are comprised in the same circle whose radius is greater than or equal to the radius of the circular arc making the junction between the first surface and the second surface.

According to another particular characteristic of the invention, the minima of each circumferential corrugation curve are comprised in the same circle whose radius is identical to the circular arc making the junction between the first surface and the second surface.

Thus, it is ensured that the least possible stresses are obtained in the fibers during the deformation of the fibrous blank.

According to another particular characteristic of the invention, the correction curvatures located on the maxima of the circumferential corrugations have larger radii of curvature than the correction curvatures located on the inflection points of the circumferential corrugations.

Indeed, the circumferential corrugations deform the second surface and can therefore lead to lacks of material on the maxima of the circumferential corrugations. Thus, by using more curved correction curvatures on the maxima of the circumferential corrugations, more material can be provided at these locations.

According to another particular characteristic of the invention, the angle between the axial direction and the direction of extension is less than or equal to 120° and the angle between the axial direction and the direction of extension is greater than 120°.

According to another particular characteristic of the invention, the flange to be produced comprises a fillet at its junction with the body to be produced.

The invention further concerns a method for manufacturing a composite material part comprising a body of partial revolution with an axis directed along an axial direction having one or more reference radii given along the axial direction, said body extending partially around the axial direction along a circumferential direction, and at least one flange extending from one end of the body along a direction of extension, the method comprising:
  forming a fibrous blank of the part to be obtained by depositing a plurality of fibrous plies by automatic fiber placement on a draping mold comprising a first draping surface and a second draping surface located in the extension of the first draping surface, the first draping surface and the second draping surface corresponding respectively to at least the first surface and the second surface determined according to the method for determining a geometry of a draping mold according to the invention, the portion of the blank produced on the first draping surface corresponding to a blank of the body and the portion of the blank produced on the second draping surface corresponding to a blank of the flange,
  shaping the fibrous blank so as to obtain a fibrous preform, said shaping comprising the deployment of the body blank in the circumferential direction so as to obtain a body preform having the reference radius along the axial direction and having the shape of the body to be produced, and shaping the flange blank so as to obtain a flange preform extending from the end of the body preform in the direction of extension and having the shape of the flange to be produced, then
  densifying the fibrous preform by a matrix so as to obtain the composite material part.

Thus, the flange blank has corrugations corresponding to the circumferential corrugation curves and to the correction curvatures of the second draping surface.

According to one particular characteristic of the invention, the deployment of the body blank and the shaping of the flange blank are carried out simultaneously.

Thus, the shaping of the fibrous blank to obtain the fibrous preform to be densified is carried out in a single step, the corrugations present on the flange blank being completely smoothed during this single step. This embodiment is therefore simplified and faster. An intermediate shaping step is therefore avoided.

According to another particular characteristic of the invention, an intermediate shaping of the flange blank is first carried out so as to obtain an intermediate flange preform extending from the end of the body blank in an intermediate direction of extension, the angle between the intermediate direction of extension and the axial direction being smaller than the angle between the direction of extension and the axial direction but greater than the angle between the direction of extension and the axial direction, then the deployment of the body blank is carried out so as to obtain the body preform and so as to carry out the shaping of the intermediate flange preform in order to obtain the flange preform extending from the end of the body preform in the direction of extension and having the shape of the flange to be produced.

In this embodiment, the intermediate step of shaping the flange blank, which makes it possible to partially fold down the flange blank by smoothing the corrugations, and the step of deploying the body blank, which allows the complete shaping of the flange blank, are carried out separately. In this embodiment, the intermediate flange preform no longer comprises corrugations. Better control over each of these operations is thus obtained. Furthermore, by carrying out these two steps separately, it is for example possible to carry out compaction after the intermediate shaping of the flange blank and before the deployment of the body blank.

The invention further concerns a method for manufacturing a composite material part comprising a body of complete revolution with an axis directed along an axial direction having one or more given reference radii, said body extending partially around the axial direction along a circumferential direction, and at least one flange extending from one end of the body along a direction of extension, the method comprising:

producing part sectors comprising a body sector of partial revolution with an axis directed along an axial direction having the given reference radius, said body sector extending partially around the axial direction along a circumferential direction, and at least one flange sector extending from one end of the body sector along a direction of extension, the manufacturing of said part sectors being carried out according to the manufacturing method of the invention described above, assembling the part sectors to obtain the composite material part having a complete revolution.

Thus, the draping mold geometry of the invention makes it possible to produce not only parts with a partial revolution but also parts of complete revolution by assembling several part sectors of partial revolution.

BRIEF DESCRIPTION OF THE DRAWINGS

FIG. 1 is a three-dimensional view of a part that can be produced by using a draping mold according to the invention, comprising a body and at least one flange.

FIG. 2A is a schematic sectional view of the part of FIG. 1 at the level of a first radius of the part.

FIG. 2B is a schematic sectional view of the part of FIG. 1 at the level of a second radius of the part.

FIG. 2C is a schematic sectional view of the part of FIG. 1 at the level of a third radius of the part.

FIG. 3 is a three-dimensional schematic view of the first surface of a mold according to the invention.

FIG. 4A is a schematic sectional view of the first surface of FIG. 3 at the level of a first radius of said first surface.

FIG. 4B is a schematic sectional view of the first surface of FIG. 3 at the level of a second radius of said first surface.

FIG. 4C is a schematic sectional view of the first surface of FIG. 3 at the level of a third radius of said first surface.

FIG. 5 is a partial schematic sectional view of the part of FIG. 1 for determining the lengths of the circular arcs belonging to the flange.

FIG. 6 is a partial schematic sectional view of the part of FIG. 1 for determining the lengths of the flange.

FIG. 7 is a three-dimensional view of the first and second surfaces obtained according to the invention for producing a draping mold for the part of FIG. 1.

FIG. 8 is a view of the surfaces illustrated in FIG. 7 illustrating circumferential corrugations.

FIG. 9 is a first partial three-dimensional view of the surfaces illustrated in FIG. 7 illustrating correction curvatures.

FIG. 10 is a second partial three-dimensional view of the surfaces illustrated in FIG. 7 illustrating correction curvatures.

FIG. 11 is a schematic illustration of a draping mold comprising the surfaces illustrated in FIGS. 7 to 10.

FIG. 12 is a schematic and partial illustration of the formation of a draped assembly by automatic fiber placement.

FIG. 13 is a schematic partial illustration of a fibrous blank obtained by draping on the mold illustrated in FIG. 11.

FIG. 14 is a schematic partial illustration of an intermediate fibrous preform obtained by deployment of the blank illustrated in FIG. 13.

FIG. 15 is a partial schematic illustration of a fibrous preform obtained by shaping of the blank illustrated in FIG. 13 or of the intermediate preform illustrated in FIG. 14.

FIG. 16 is a schematic illustration of a complete part of revolution obtained by assembly of two parts as illustrated in FIG. 1.

DESCRIPTION OF THE EMBODIMENTS

FIG. 1 illustrates a part 4 made of composite material comprising a body 1 and at least one flange 2. The term "flange" can designate a collar. The part 4 can be an aeronautical engine casing comprising two flanges.

The body 1 is a volume of partial revolution whose axis of revolution A is directed along an axial direction $D_A$. The body 1 extends partially about its axis of revolution A along a circumferential direction $D_C$. The circumferential direction $D_C$ extends circularly in a plane perpendicular to the axial direction $D_A$. The body 1 can have a truncated cone or tubular shape, or any axisymmetric profile.

The body 1 has one or more reference radii given along said axial direction $D_A$. In each plane perpendicular to the axial direction $D_A$, the reference radius $R_{R1}$, $R_{R2}$, $R_{R3}$ is defined as the distance between the axial direction $D_A$ and the circular arc formed by the body 1, and corresponds to a position $r_1$, $r_2$, $r_3$ of the axial direction $D_A$, as illustrated in FIGS. 1, 2A, 2B and 2C. Furthermore, each position $r_1$, $r_2$, $r_3$ is also associated with a length $L_1$, $L_2$, $L_3$ of the circular arc formed by the body 1 in the plane perpendicular to the axial direction $D_A$ and passing through said position $r_1$, $r_2$, $r_3$.

In the example illustrated in FIGS. 1, 2A, 2B and 2C, the circular arc formed by the body 1 of the part 4 in each plane perpendicular to the axial direction $D_A$ is intercepted by a reference angle $\theta_R$ of 180°. There is of course no departure from the framework of the invention if the reference angle $\theta_R$ intercepting the circular arc formed by the body 1 in each plane perpendicular to the axial direction $D_A$ is less than 180°, or greater than 180° but strictly less than 360°.

The flange 2 is present at one end of the body 1, and extends from said end of the body 1. The flange 2 has an annular or truncated cone shape with a partial axis of revolution A directed along the axial direction $D_A$. The flange 2 extends from the body 1 in along a direction of extension $D_E$.

Thus, the entire composite material part 4 is a volume of partial revolution with an axis A directed along the axial direction $D_A$. The direction of extension $D_E$ is defined for each point of the junction between the body 1 and the flange 2. The directions of extension $D_E$ at two different points of said junction may be oriented differently. However, the directions of extension $D_E$ defined for each point of the junction between the body 1 and the flange 2 must intersect at a single point belonging to the axis of revolution A of the part 4.

In the example illustrated in FIG. 1, the flange 2 forms an angle of 90° with the axis of revolution A of the body 1, which corresponds to a direction of extension $D_E$ perpendicular to the axial direction $D_A$. Furthermore, the flange 2 forms an acute angle less than 90° with the surface of the body 1 from which it extends, which makes the part 4 particularly difficult to produce by the method of the automatic fiber placement according to the techniques of the prior art. There is of course no departure from the framework of the invention if the flange forms an angle less than 90° with the axis of revolution of the body, which corresponds to an angle less than 90° between the direction of extension and the axial direction. There is also no departure from the framework of the invention if the flange forms an angle greater than 90° with the axis of revolution of the body, if this angle is small enough to cause collision problems during the automatic draping of said angle.

It is desired to produce the composite material part 4 illustrated in FIG. 1 by draping fibrous structures on a surface, according to the well-known method of automatic fiber placement (AFP). However, the small angle formed between the flange 2 and the body 1 of the part 4 does not make it possible to carry out a draping directly on a surface with the shape of the final part 4. Indeed, this angle does not allow the complete passage of an automatic deposition head or roller, and thus results in unsatisfactory deposition of the fibrous structures at the bottom of the angle.

The invention therefore proposes to design a particular draping geometry having a large or even flat angle between a first surface intended to drape the blank of the body 1 and a second surface intended to drape the blank of the flange 2, in order to be able to carry out the automatic draping of the fibrous structures.

In order to allow the shaping of the draped fibrous blank at the correct angle without leading to the creation of significant tensions in the draped fibrous structures, and more particularly in the vicinity of the apex of the angle between the flange 2 and the body 1, it is necessary to design a particular geometry for the draping mold.

For the sake of simplification of the figures and the description, the first "geometric" surface determined according to the method for determining a draping geometry of the invention and the first "actual" draping surface of the mold are identical and coincident to bear the same reference "100". Similarly, the second "geometric" surface determined according to the method for determining a draping geometry of the invention and the second "actual" draping surface of the mold are identical and coincident to bear the same reference "200". Of course, there is no departure from the framework of the invention if the first and second "actual" draping surfaces correspond only to a portion of the first and second determined "geometric" surfaces.

The mold comprises a first draping surface 100 for draping the fibrous blank of the body 1, and a second draping surface 200 for draping the fibrous blank of the flange 2. The second surface 200 of the mold extends in the extension of the first surface 100 of the mold, along a direction of extension $D_P$.

Preferably, at any point of the junction between the first surface and the second surface, the tangent of the first surface is coincident with the tangent of the second surface.

There is of course no departure from the framework of the invention if, at any point of the junction between the first surface and the second surface, the tangent of the first surface is slightly inclined relative to the tangent of the second surface, provided that the junction between the first surface and the second surface is easily accessible for a head or a roller for automatically depositing fibrous structures. Thus, at any point of the junction between the first surface and the second surface, the angle between the tangent of the first surface and the tangent of the second surface is typically greater than or equal to 120°, and preferably equal to 180°.

The first surface 100 is a partial or complete surface of revolution whose axis of revolution is directed along the axial direction $D_A$. The length of the first surface 100 in the axial direction $D_A$ is at least equal to the length of the body 1 to be manufactured in the axial direction $D_A$.

The circular arc formed by the first surface 100 in each plane perpendicular to the axial direction $D_A$ is intercepted by a construction angle $\theta_C$ greater than the reference angle $\theta_R$, as illustrated in FIGS. 3, 4A, 4B and 4C. The first surface 100 therefore has a more "closed" shape than the body 1 in the circumferential direction $D_C$. In the case where the first surface 100 is a surface of complete revolution, and therefore the circular arc formed by the first surface 100 of the mold in each plane perpendicular to the axial direction $D_A$ is a complete circle, it is considered that the construction angle $\theta_C$ is equal to 360°.

Preferably, the transformation ratio, which corresponds to the ratio between the reference angle $\theta_R$ and the construction angle $\theta_C$, is comprised between 0.6 and 0.8. For example, a half-shell-shaped body 1, i.e. having a reference angle $\theta_R$ of 180° as in FIGS. 1 to 2C, and a first surface having a complete revolution, i.e. having a construction angle $\theta_C$ of 360°, will correspond to a transformation ratio of 0.5.

The first surface 100 has one or more construction radii along the axial direction $D_A$, as illustrated in FIGS. 3, 4A, 4B and 4C. In each plane perpendicular to the axial direction $D_A$, the construction radius is defined as the distance between the axial direction $D_A$ and the circular arc formed by the first surface 100. For each position $r_1$, $r_2$, $r_3$ of the axial direction $D_A$ corresponding to a reference radius $R_{R1}$, $R_{R2}$, $R_{R3}$ of the body 1, a construction radius $R_{C1}$, $R_{C2}$, $R_{C3}$ of the first surface 100 is associated. Consequently, each construction radius $R_{C1}$, $R_{C2}$, $R_{C3}$ of the first surface 100 is associated with a reference radius $R_{R1}$, $R_{R2}$, $R_{R3}$. For each position $r_1$, $r_2$, $r_3$ of the axial direction $D_A$, the construction radius $R_{C1}$, $R_{C2}$, $R_{C3}$ of the first surface 100 must be smaller than the corresponding reference radius $R_{R1}$, $R_{R2}$, $R_{R3}$.

For each position $r_1$, $r_2$, $r_3$ of the axial direction $D_A$, the length of the circular arc formed by the first surface 100 is identical to the length $L_1$, $L_2$, $L_3$ of the circular arc of the body 1 associated with said position $r_1$, $r_2$, $r_3$. In other words, for determining the first surface 100 of the mold, the curvilinear distances of the body 1 in the circumferential direction $D_C$ are retained. Thus, for each position $r_1$, $r_2$, $r_3$ of the axial direction $D_A$, the ratio of the construction radius $R_{C1}$, $R_{C2}$, $R_{C3}$ to the reference radius $R_{R1}$, $R_{R2}$, $R_{R3}$ corresponds to the transformation ratio described above.

Thus, the first surface 100 corresponds to a curvature along the circumferential direction $D_C$ of the surface of the body to be manufactured.

A geometric model having the shape of the part to be manufactured, a first portion of the geometric model having the shape of the body to be manufactured and a second portion of the geometric model having the shape of the flange to be manufactured can be generated. When the transformation described above is applied to the first portion of the geometric model of the part to be manufactured, which corresponds to a curvature along the circumferential direction $D_C$ so as to reduce the radii, the first surface 100 is obtained. Such a transformation of the first portion of the geometric model of the part to be manufactured will generate an inclination of the second portion of the geometric model having the shape of the flange to be manufactured, which will no longer extend along the direction of extension $D_E$ but will extend along an intermediate direction of extension $D_{Pi}$, so as to obtain a second intermediate geometric surface 200b, as illustrated in FIG. 3.

The angle formed between the first surface 100 and the second intermediate geometric surface 200b is greater than the angle formed between the surface of the body and the surface of the flange to be manufactured. As a reminder, the angle formed between the axial direction and another direction must be understood here as the angle directed from the first surface 100 towards the second intermediate geometric surface 200b, said angle being measured from the part of the axial direction located on the side of the first surface 100 towards the second intermediate geometric surface 200b.

The second surface 200 of the mold is designed in several steps. The second surface 200 is preferably determined from the second intermediate geometric surface 200b. However, there is no departure from the framework of the invention if the second surface 200 is determined directly from the geometric model of the flange to be produced.

The first step consists in determining the perimeter of one or more circular arcs belonging to the flange or to the second intermediate geometric surface 200b according to the chosen reference, said circular arcs having as their center a point belonging to the axis of revolution, depending on their distance relative to the axis of revolution and on the position of their center on the axis of revolution. In the example illustrated in FIGS. 5 and 6, said circular arcs belong to a plane perpendicular to the axial direction.

In the case where the second surface 200 is determined directly from the geometric model of the flange to be produced, if a fillet makes the junction between the flange and the body, or in the case where the direction of extension is not perpendicular to the axial direction, it is necessary to take into account the position of the center of the circular arcs belonging to the flange on the axis of revolution. It is considered that the fillet making the junction between the flange and the body is part of the flange.

In the case where the second surface 200 is determined from the second intermediate geometric surface 200b, if a fillet makes the junction between the first surface 100 and the second intermediate geometric surface 200b, or in the case where the intermediate direction of extension $D_{Pi}$ is not perpendicular to the axial direction, it is necessary to take into account the position of the center of the circular arcs belonging to the intermediate geometric surface 200b on the axis of revolution. It is considered that the fillet making the junction between the first surface 100 and the second intermediate geometric surface 200b is part of the second intermediate geometric surface 200b.

In our example illustrated in FIGS. 5 and 6, the fillet between the first surface 100 and the second intermediate geometric surface 200b must be taken into account, because there is a fillet between the body 1 and the flange 2. Thus, it is therefore necessary to determine the length of the circular arcs belonging to the second intermediate geometric surface 200b and of the circular arcs belonging to the part of the second intermediate geometric surface 200b extending along the intermediate direction of extension $D_{Pi}$.

If the second surface 200 were determined directly from the geometric model of the flange to be produced, the length of the circular arcs belonging to the fillet of the flange 2 and the circular arcs belonging to the part of the flange 2 extending along the direction of extension $D_E$ would be determined.

It is possible to choose several points $A_0, A_1, A_2, A_3, A_4, A_5$ belonging to the second intermediate geometric surface 200b or to the flange 2 disposed at different distances from the axis of revolution A, as illustrated in FIGS. 5 and 6. The chosen points $A_0, A_1, A_2, A_3, A_4, A_5$ preferably comprise a point $A_0$ belonging to the junction between the first surface 100 and the second intermediate geometric surface 200b, or to the junction between the model of the body and the model of the flange 2 to be produced as the case may be, and a point $A_5$ belonging to the end of the second intermediate geometric surface 200b or of the geometric model of the flange 2 as the case may be. Since a fillet is present, it is necessary to discretize the fillet. Thus, the chosen points $A_0, A_1, A_2, A_3, A_4$, As preferably comprise a point $A_1$ belonging to the fillet and a point $A_2$ present at the end of the fillet opposite to the junction. There is of course no departure from the framework of the invention if more or less points are chosen, or if their placement is different.

Each of the points $A_0, A_1, A_2, A_3, A_4, A_5$ is respectively associated with a position $a_0, a_1, a_2, a_3, a_4, a_5$ on the axis of revolution A, as illustrated in FIG. 5. Each of the points $A_0, A_1, A_2, A_3, A_4, A_5$ is also associated with a circular arc comprising said point whose center belongs to the axis of revolution A. Thus, each of the points $A_0, A_1, A_2, A_3, A_4, A_5$ is respectively associated with a circular arc whose center has a position $a_0, a_1, a_2, a_3, a_4, a_5$. Each circular arc associated with a point $A_0, A_1, A_2, A_3, A_4$, As has respectively a length $l_0, l_1, l_2, l_3, l_4, l_5$ along the circumferential direction $D_C$.

The second step consists in determining one or more curvilinear lengths from the junction between the first surface 100 and the second intermediate geometric surface 200b, or from the junction between the geometric models of the flange and of the body, as the case may be, to one or more of the circular arcs belonging to the second intermediate geometric surface 200b or to the flange.

In the case where the second surface 200 is determined directly from the geometric model of the flange to be produced, if a sharp ridge makes the junction between the flange and the body, the curvilinear lengths to be determined between the junction and the circular arcs belonging to the flange are rectilinear lengths extending along the direction of extension $D_E$. Thus, in this configuration, the lengths from the junction are easy to determine. In the case where a fillet makes the junction between the flange and the body, the curvilinear lengths to be determined between the junction and the circular arcs belonging to the flange are not rectilinear.

In the case where the second surface 200 is determined from the second intermediate geometric surface 200b, if a sharp ridge makes the junction between the first surface 100 and the second intermediate geometric surface 200b, the curvilinear lengths to be determined between the junction and the circular arcs belonging to the second intermediate geometric surface 200b are rectilinear lengths extending along the intermediate direction of extension $D_{Pi}$. Thus, in this configuration, the lengths from the junction are easy to determine. In the case where a fillet makes the junction between the first surface 100 and the second intermediate geometric surface 200b, the curvilinear lengths to be determined between the junction and the circular arcs belonging to the second intermediate geometric surface 200b are not rectilinear.

In our example illustrated in FIGS. 5 and 6, the fillet between the first surface 100 and the second intermediate geometric surface 200b must be taken into account, because there is a fillet between the body 1 and the flange 2. Thus, it is therefore necessary to determine the curvilinear lengths between the junction and the circular arcs belonging to the second intermediate geometric surface 200b or to the geometric model of the flange 2 as the case may be.

The points $A_0, A_1, A_2, A_3, A_4, A_5$ for which the associated circular arcs lengths $l_0, l_1, l_2, l_3, l_4, l_5$ are known are reconsidered. By plotting the curvilinear lengths between the points $A_0$, $A_1$, $A_2$, $A_3$, $A_4$, $A_5$ on the direction of extension $D_P$, as illustrated in FIG. 6, a corresponding set of points $B_0$, $B_1$, $B_2$, $B_3$, $B_4$, $B_5$ separated by the curvilinear lengths $e_1$, $e_2$, $e_3$, $e_4$, $e_5$ is obtained. Thus, the curvilinear length from the junction to the circular arc corresponding to the point $A_4$ will be the sum of the lengths $e_1$, $e_2$ and $e_3$. The total curvilinear length $e_{total}$ of the second intermediate geometric surface 200b or of the flange 2 from the junction up to its end will therefore be the length between $B_0$ and $B_5$, i.e. the sum of the lengths $e_1$, $e_2$, $e_3$, $e_4$ and $e_5$, as illustrated in FIG. 6.

Consequently, each length $l_0$, $l_1$, $l_2$, $l_3$, $l_4$, $l_5$ of a circular arc is associated with a curvilinear length defined from the junction having respectively the value 0, $e_1$, $e_1+e_2$, $e_1+e_2+e_3$, $e_1+l_2+l_3+e_4$, $e_{total}$.

In general, the first step and the second step can be carried out simultaneously, or one after the other in any order. At the end of the first two steps, each curvilinear length starting from the junction is associated with a length of a circular arc.

The third step consists in determining the geometry of the second surface 200 of the mold, which extends in the extension of the first surface 100 of the mold along the direction of extension $D_P$.

As illustrated in FIGS. 7 and 8, the second surface 200 is designed so as to have corrugations in the circumferential direction $D_C$. Thus, the second surface 200 has a plurality of curves 21, 22, 23, 24, 25 of circumferential corrugations following one another in the way of the axial direction $D_A$. A curve of circumferential corrugations comprises all of the points located at the same curvilinear distance from the junction between the first surface 100 and the second surface 200, said curvilinear distance belonging to the second surface 200.

The corrugations of the same curve 21, 22, 23, 24, 25 have a regular period in the circumferential direction $D_C$. The corrugations of the curves 21, 22, 23, 24, 25 are composed of a continuous alternation of concave and convex curves along the circumferential direction $D_C$. The corrugations of the curves 21, 22, 23, 24, 25 are preferably periodic, and possibly sinusoidal or generally sinusoidal, as illustrated in FIG. 8.

The corrugations of the same curve 21, 22, 23, 24, 25 have a plurality of maxima and a plurality of minima, the plurality of maxima being distributed over a circle whose center belongs to the axis of revolution A of the first surface 100, and the plurality of minima being distributed over a circle whose center belongs to the axis of revolution A of the first surface 100. Thus, the corrugations of the same curve 21, 22, 23, 24, 25 have constant amplitude in the circumferential direction $D_C$. The minima are defined as the points of the curves 21, 22, 23, 24, 25 closest to the axis of revolution A, and the maxima are defined as the points of the curves 21, 22, 23, 24, 25 furthest from the axis of revolution A.

The inflection points of the same curve 21, 22, 23, 24, 25 of corrugations are distributed on a circle whose center belongs to the axis of revolution of the first surface.

The amplitude and the number of corrugations of the curves 21, 22, 23, 24, 25 are chosen so as to allow the passage of the automatic fiber deposition head at any point of the second surface 200. Thus, the amplitude is not too great in order to allow the passage of said head, or to be able to deposit several strands at a time.

In the example illustrated in FIGS. 7 to 10, the minima of all the circumferential corrugation curves are distributed over circles of identical radii, and of the same radius as the circular arc 20 forming the junction between the first surface 100 and the second surface 200. There is of course no departure from the framework of the invention if the minima of all the circumferential corrugation curves are distributed over circles of identical radii, but of a radius greater than the radius of the circular arc forming the junction between the first surface and the second surface. There is also no departure from the framework of the invention if the minima of each circumferential corrugation curve are distributed over circles of different radii, provided that said radii are greater than the radius of the circular arc forming the junction between the first surface and the second surface.

There is also no departure from the framework of the invention if it is the inflection points of all the circumferential corrugation curves that are distributed over circles of identical radii, and of the same radius as the circular arc forming the junction between the first surface and the second surface.

The further away from the junction between the first surface 100 and the second surface 200 in the axial direction $D_A$, the more the circumferential corrugation curves 21, 22, 23, 24, 25 progressively have a large amplitude, as illustrated in FIGS. 7 to 10.

The curvilinear length of each of the curves 21, 22, 23, 24, 25 of circumferential corrugations depends on the curvilinear distance of said curve of circumferential corrugations 21, 22, 23, 24, 25 relative to the junction between the first surface 100 and the second surface 200. By using the pairs of circular arc length and curvilinear length defined from the junction $(l_1; e_1)$, $(l_2; e_1+l_2)$, $(l_3; e_1+l_2+l_3)$, $(l_4; e_1+l_2+e_3+e_4)$, $(l_5; e_{total})$ determined at the end of the first and second steps, it is obtained that the curvilinear length of a curve 21, 22, 23, 24, 25 of circumferential corrugations located at a given curvilinear distance from the junction is the length of the circular arc $l_1$, $l_2$, $l_3$, $l_4$, $l_5$ previously associated with said curvilinear distance $e_1$, $e_1+e_2$, $e_1+e_2+e_3$, $e_1+l_2+e_3+e_4$, $e_{total}$ defined from the junction.

Thus the curves 21, 22, 23, 24, 25 of circumferential corrugations have respectively a curvilinear length $l_1$, $l_2$, $l_3$, $l_4$, $l_5$ when they are away from the junction respectively from a curvilinear distance $e_1$, $e_1+e_2$, $e_1+e_2+e_3$, $e_1+l_2+l_3+l_4$, $e_{total}$.

As illustrated in FIGS. 9 and 10, the second surface 200 is designed to have curvatures 32, 33 in the direction of extension $D_P$. Thus, the distances $e_1$, $e_2$, $e_3$, $e_4$, $e_{total}$ may not be rectilinear depending on their position on the second surface 200. These curvatures 32, 33, called "correction" curvatures, are necessary in order to limit the stresses during the deformation of the draped assembly, mainly at the junction between the future body and the future flange. Indeed, if the distances $e_1$, $e_2$, $e_3$, $e_4$, $e_{total}$ were rectilinear, as is the case in the prior state, the distance between the junction and the end of the second surface 200 would vary depending on its position relative to the circumferential corrugations.

For example, if the minima of all the circumferential corrugation curves are distributed over circles of the same radius as the circular arc 20 forming the junction between the first surface 100 and the second surface 200 as in our example (see FIG. 8), the rectilinear distance between the junction and the end of the second surface 200 would be shorter in the trough of the circumferential corrugations and greater on the hump of the circumferential corrugations. Thus, at the time of deformation of the draped assembly, there would be a lack of length in the direction of extension $D_E$ at several locations of the flange 2, which would create stresses in the composite material of the part 4.

The correction curvatures 32, 33 presented by the second surface 200 in the direction of extension $D_P$ have at least one inflection point, as illustrated in FIG. 9. The correction curvatures 32, 33 presented by the second surface 200 in the direction of extension $D_P$ may be portions of a corrugation curve oscillating between a maximum and a minimum.

The second surface 200 may also comprise rectilinear lengths 31, which extend from the junction towards the end of the surface 200 along the direction of extension $D_P$.

All the correction curvatures 32, 33 and rectilinear lengths 31 of the second surface 200 directed along the direction of extension $D_P$ have an identical curvilinear length, with a value $e_{total}$ determined during the previous steps, as illustrated in FIG. 10. Furthermore, the curvilinear distance traveled by a correction curvature 32, 33 or by a rectilinear length 31 along the direction of extension $D_P$ between the junction and a curve 21, 22, 23, 24 or 25 of circumferential corrugations will respectively have the value $e_1$, $e_1+l_2$, $e_1+l_2+e_3$, $e_1+e_2+e_3+e_4$, $e_{total}$.

A set of points $C_0$, $C_1$, $C_2$, $C_3$, $C_4$, $C_5$ located at the intersection between a rectilinear length 31 (or a correction curvature 32, 33) and each of the curves 21, 22, 23, 24, 25 of circumferential corrugations are thus obtained. When the portion draped on the second surface 200 will be deformed in the direction of extension $D_E$, each point in contact with a point $C_0$, $C_1$, $C_2$, $C_3$, $C_4$, $C_5$ will be respectively located at the location of the point $A_0$, $A_1$, $A_2$, $A_3$, $A_4$, $A_5$ chosen during the first or the second step.

Finally, the parameters of the circumferential corrugations and of the correction curvatures 32, 33 of the second surface 200, such as the amplitude or the radii of curvature, are chosen so as to allow the passage of the automatic fiber deposition head at any point of the second surface 200.

The design of a draping geometry described above thus makes it possible to produce a suitable mold 500 for automatic fiber draping (AFP), comprising the first surface 100 and the second surface 200, as illustrated in FIG. 11. The mold can be produced by additive manufacturing, or according to the usual manufacturing means such as machining or casting. The mold can be in several separable parts rather than in a single piece, in order to facilitate the demolding operation(s).

a method for manufacturing a composite material part will now be described in relation to FIGS. 12 to 15, comprising at least a step of draping by automatic fiber placement on a mold designed as described above.

FIG. 12 schematically illustrates the structure of a deposition head 6 of a device for implementing an AFP technique. The structure of the deposition head 6 is well known. The deposition head 6 is fed by a strip or a fibrous wick 30.

The fibrous strip or wick 30 may be dry or impregnated. The fibrous strip or wick 30 may for example be impregnated with an aqueous suspension comprising matrix precursor particles, be impregnated with a thermosetting polymer or be impregnated with a thermoplastic polymer, as described in document FR3062336A$_1$. More generally, the strip 30 may be impregnated with a resin.

The fibrous strip or wick 30 can be conveyed by a conveying element 5 up to a pressure application element 7 located on the side of the surfaces 100 and 200 of the draping mold. The conveying element 5 is here in the form of a pair of counter-rotating rollers 5a and 5b between which the strip or wick 30 is present. The conveying element 5 makes it possible to advance the strip or wick 30 up to the pressure application element 7. The pressure application element 7 applies pressure on the strip or wick 30 in order to carry out a deposition on the first and second surfaces 100 and 200 of the draping mold. The pressure application element 7 is here in the form of a roller.

The deposition head 6 may further include a heating element 9 located in the vicinity of the pressure application element 7. This heating element 9 makes it possible, in the case of a strip or wick 30 impregnated with a thermoplastic or thermosetting polymer, to heat the impregnated strip or wick 30 during its deposition in order to fluidify the polymer and thus impart the desired adhesive power to the deposited strip or wick 30.

During deposition, the deposition head 6 is movable in order to apply the strip or wick 30 to a first determined area of the draping mold, for example on a portion of the first surface 100 of the mold. Once the application has been carried out on this first area, a cutting element 11 of the deposition head 6 cuts the strip or wick 30. After this cutting, the deposition of a first fibrous structure is thus obtained, formed by a first section of the strip or wick 30, on the first area of the mold.

The formation of the blank is then continued by advance of the strip or wick 30 in the deposition head 6 up to the pressure application element 7 by actuation of the conveying element 5. The deposition head 6 can be moved in order to carry out the deposition of the wick or strip 30 on a second area of the mold. The deposition of a second fibrous structure, formed by a second section of the strip 30, on the second area of the mold is then obtained in a manner similar to the one described previously.

The production of the blank is then continued by the deposition of several other fibrous structures in the same manner as described above, until covering the first surface 100 and the second surface 200.

Chemical or thermal treatments can then be carried out on the blank depending on the nature of the draped fibrous structures.

A fibrous blank 4b produced by draping as illustrated in FIG. 13 is then obtained, comprising a body blank 1b having been draped on the first surface 100, and a flange blank 2b having been draped on the second surface 200. The body blank 1b and the flange blank 2b form the fibrous blank 4b.

The fibrous blank 4b is then shaped so as to obtain a fibrous preform 4d having the shape of the part 4 to be produced and comprising a body preform 1d and a flange preform 2d. The shaping of the fibrous blank 4b comprises the shaping of the body blank 1b and the shaping of the flange blank 2b, which can be carried out simultaneously or one after the other.

According to a first variant, the shaping of the fibrous blank 4b comprises a first intermediate step of shaping the flange blank 2b so as to obtain an intermediate flange preform 2c located in the extension of the body blank 1b and extending from the body blank 1b in the intermediate direction of extension $D_{Pi}$, as illustrated in FIG. 14. This intermediate flange preform 2c is obtained by a partial folding of the flange blank 2b, said folding being allowed by the corrugations present on said flange blank 2b. In the first step of this first variant, the body blank 1b does not undergo any deformation.

Preferably, this variant corresponds to the case where the second surface 200 of the mold has been determined from the second intermediate geometric surface 200b, and not directly from the geometric model of the flange 2. Thus, the intermediate flange preform 2c has the shape of the second intermediate geometric surface 200b described above. Thanks to the particular geometry of the second surface 200 used to drape the flange blank 2b, the flange blank 2b deforms perfectly so that each corrugation curve 21, 22, 23, 24, 25 becomes a circular arc having a suitable radius and so that each correction curvature 32, 33 extends in the intermediate direction of extension $D_{Pi}$. Thus, there are no significant stresses in the fibers of the intermediate flange preform $2c$, particularly at the junction between the body blank $1b$ and the intermediate flange preform $2c$.

In this first variant, the shaping of the fibrous blank $4b$ also comprises a second step of shaping the body blank $1b$ illustrated in FIG. 15, carried out after the first step illustrated in FIG. 14. During this second step, the body blank $1b$ is deployed in the circumferential direction $D_C$ so as to obtain the body preform $1d$. The deployment step makes it possible to "open" the body blank $1b$ by reducing the value of the angle intercepting the circular arc formed by said blank in each plane perpendicular to the axial direction $D_A$: the angle decreases from the construction value $\theta_C$ until reaching the desired reference angle $\theta_R$. Furthermore, the deployment step makes it possible to increase the radii presented by the body blank $1b$ along the axial direction $D_A$ from the construction values $R_{C1}$, $R_{C2}$, $R_{C3}$ until reaching the desired reference values $R_{R1}$, $R_{R2}$, $R_{R3}$. Thus, at the end of the deployment step, the body preform $1d$ obtained has the same dimensions as the body $1$ to be obtained.

The deployment of the body blank $1b$ further results in the shaping of the intermediate flange preform $2c$ into a flange preform $2d$ having the shape and the geometry of the flange $2$ to be obtained. Indeed, the deployment of the body blank $1b$ to obtain the body preform $1d$ results in a change of inclination of the intermediate flange preform $2c$. Thus, the intermediate flange preform $2c$ extending in the intermediate direction of extension $D_{Pi}$ from the body blank $1b$ before the second step becomes, following this second step, a flange preform $2d$ extending in the direction of extension $D_E$ from the body preform $1d$.

In this first variant, an intermediate compaction step can be carried out between the first and the second step.

According to a second variant, the shaping of the fibrous blank $4b$ comprises a first step of shaping the body blank $1b$ so as to obtain a body preform $1d$.

During this first step, the body blank $1b$ is deployed in the circumferential direction $D_C$ so as to obtain the body preform $1d$. The deployment step makes it possible to "open" the body blank $1b$ by decreasing the value of the angle intercepting the circular arc formed by said blank in each plane perpendicular to the axial direction $D_A$: the angle decreases from the construction value $\theta_C$ until reaching the desired reference angle $\theta_R$. Furthermore, the deployment step makes it possible to increase the radii presented by the body blank $1b$ along the axial direction $D_A$ from the construction values $R_{C1}$, $R_{C2}$, $R_{C3}$ until reaching the desired reference values $R_{R1}$, $R_{R2}$, $R_{R3}$. Thus, at the end of the deployment step, the body preform $1d$ obtained has the same dimensions as the body $1$ to be obtained.

The deployment of the body blank $1b$ further results in an intermediate shaping of the flange blank $2b$ which makes it possible to obtain a transition preform of the flange (variant not illustrated). Indeed, the deployment of the body blank $1b$ to obtain the body preform $1d$ results in a change of inclination of the flange blank $2b$. Thus, the flange blank $2b$ extending in the direction of extension $D_P$ from the body blank $1b$ before the first step becomes, following this first step, a flange transition preform extending in a transition direction of extension from the body preform $1d$. As a reminder, the angle formed between the axial direction and another direction must be understood here as the angle directed from the surface of the blank or the body preform towards the surface of the blank or the transition preform of the flange, said angle being measured from the part of the axial direction located on the side of the surface of the blank or of the body preform towards the surface of the blank or of the transition preform of the flange.

Preferably, this variant corresponds to the case where the second surface $200$ of the mold was determined directly from the geometric model of the flange $2$, and not from a second intermediate geometric surface $200b$ as described above. Thus, the flange transition preform always has the corrugations described above.

In this first variant, the shaping of the fibrous blank $4b$ also comprises a second step of shaping the flange transition preform into a flange preform $2d$. The flange preform $2d$ is obtained by folding down the flange transition preform, said folding being allowed by the corrugations present on said flange transition preform. In the second step of this second variant, the body preform $1d$ does not undergo any deformation.

In this second variant, an intermediate compaction step can be performed between the first and the second step.

In the first variant and the second variant described here, carrying out the two steps separately from each other allows for better control of each step, and particularly better control of the deployment of the body blank $1b$ and better control of the smoothing of the corrugations initially present on the flange blank $2b$.

However, it may be desired to quickly carry out the shaping of the fibrous blank $4b$ of the part, at once. In this third variant, the shaping of the fibrous blank $4b$ into a fibrous preform $4d$ of the part $4$ is carried out in a single step comprising both the deployment of the body blank $1b$ and the complete folding, as well as the smoothing of the corrugations of the flange blank $2b$.

At the end of each of the three variants described above, a fibrous preform $4d$ of the part to be produced is obtained, comprising the body preform $1d$ of the body $1$ to be produced and the flange preform $2d$ of the flange $2$ to be produced, as illustrated in FIG. 15. Thanks to the particular geometry of the second surface $200$ used to drape the flange blank $2b$, the flange blank $2b$ deforms perfectly so that each corrugation curve $21$, $22$, $23$, $24$, $25$ becomes a circular arc of the flange $2$ to be produced having a suitable radius and so that each correction curvature $32$, $33$ extends in the direction of extension $D_E$. Thus, there are no significant stresses in the fibers of the fibrous preform $4d$, particularly at the junction between the body preform $1d$ and the flange preform $2d$.

The deployment and the shaping of the fibrous blank $4b$ can be carried out using one or more reference mandrels having the shape of the body $1$ to be produced, of the flange $2$ to be produced or of the desired intermediate flange preform $2c$. The fibrous blank is thus deployed, shaped or smoothed so as to match the shape of the mandrel(s). The shaping of the fibrous blank $4b$ can be carried out by mechanical deformation. The shaping of the fibrous blank $4b$ can also be carried out using a bladder.

The fibrous preform $4$ thus obtained can then be heat treated in order to form the matrix, if this step has not yet been carried out, so as to obtain the final part $4$, or at least one intermediate part close to the final part $4$.

If it is desired to manufacture a composite material part having a complete revolution about an axis of revolution, comprising a complete body of revolution and a flange extending from one end of said body, its manufacture can be broken down by producing several sectors of said part distributed about the axis of revolution, then by assembling said sectors to obtain the desired part. Since said sectors of the part have a partial revolution, they can be produced according to the manufacturing method described above.

For example, as illustrated in FIG. 16, it is possible to manufacture two parts 4 as described above, then to assemble these two parts 4 in order to form a complete part of revolution 40 with an axis of revolution A.

In the present application, the thicknesses have been neglected for the geometrical considerations. If it is desired to take into account the thickness of the part, of the fibrous blank and of the fibrous preform, it is necessary to refer to the median surfaces and to the neutral lengths, so that the tension and compression effects on the upper and lower surfaces are balanced.

The expression "comprised between . . . and . . . " must be understood as including the bounds.

The invention claimed is:

1. A method for manufacturing a draping mold for producing a blank of a composite material part, the method comprising:

determining a geometry of the draping mold for producing the blank of the composite material part, said composite material part comprising a body of partial revolution with an axis directed along an axial direction and having one or more reference radii given along said axial direction, said body extending partially around the axial direction along a circumferential direction, and said composite material part comprising at least one flange extending from one end of the body along a direction of extension, the determining comprising:

determining a first surface of revolution with an axis directed in the axial direction, said first surface extending around the axial direction in the circumferential direction, determining a second surface located in the extension of the first surface along a direction of extension, the angle formed between the axial direction and the direction of extension being greater than the angle formed between the axial direction and the direction of extension, the second surface having corrugation curves in the circumferential direction successively following each other in the direction of extension, each circumferential corrugation curve corresponding to a circular arc belonging to the flange to be produced, the curvilinear length of said corrugation curve corresponding to the length of said circular arc, wherein the radius or radii presented by the first surface of revolution along the axial direction is/are smaller than the reference radius or radii for the same position along the axial direction said first surface corresponding to a curvature in the circumferential direction of a surface having the shape of the body to be produced, and wherein the second surface has correction curvatures in the direction of extension, so that all the points of each circumferential corrugation curve are at the same curvilinear distance from the junction between the first surface and the second surface, said curvilinear distance belonging to the second surface and having a value corresponding to the curvilinear distance between the circular arc belonging to the flange to be produced corresponding to said circumferential corrugation curve, and the junction between the flange and the body to be produced, and fabricating the draping mold according to the determined first surface and second surface.

2. The method according to claim 1, wherein the inflection points of each circumferential corrugation curve are comprised in the same circle.

3. The method according to claim 1, wherein the minima of each circumferential corrugation curve are comprised in the same circle whose radius is greater than or equal to the radius of the circular arc making the junction between the first surface and the second surface.

4. The method according to claim 1, wherein the correction curvatures located on the maxima of the circumferential corrugations have larger radii of curvature than the correction curvatures located on the inflection points of the circumferential corrugations.

5. The method according to claim 1, wherein the flange to be produced comprises a fillet at its junction with the body to be produced.

6. A method for manufacturing a composite material part comprising a body of partial revolution with an axis directed along an axial direction having one or more reference radii given along said axial direction, said body extending partially around the axial direction along a circumferential direction, and at least one flange extending from one end of the body along a direction of extension, the method comprising:

forming a fibrous blank of the composite material part to be obtained by depositing a plurality of fibrous plies by automatic fiber placement on a draping mold comprising a first draping surface and a second draping surface located in the extension of the first draping surface, the first draping surface and the second draping surface corresponding respectively to at least the first surface and the second surface determined according to the method according to claim 1, the portion of the blank produced on the first draping surface corresponding to a blank of the body and the portion of the blank produced on the second draping surface corresponding to a blank of the flange, shaping the fibrous blank so as to obtain a fibrous preform, said shaping comprising the deployment of the body blank in the circumferential direction so as to obtain a body preform having the reference radius or radii along the axial direction and having the shape of the body to be produced, and shaping the flange blank so as to obtain a flange preform extending from the end of the body preform in the direction of extension and having the shape of the flange to be produced, then densifying the fibrous preform by a matrix so as to obtain the composite material part.

7. The manufacturing method according to claim 6, wherein the deployment of the body blank and the shaping of the flange blank are carried out simultaneously.

8. The manufacturing method according to claim 6, wherein an intermediate shaping of the flange blank is first carried out so as to obtain an intermediate flange preform extending from the end of the body blank in an intermediate direction of extension, the angle between the intermediate direction of extension and the axial direction being smaller than the angle between the direction of extension and the axial direction but greater than the angle between the direction of extension and the axial direction, then the deployment of the body blank is carried out so as to obtain the body preform and so as to carry out the shaping of the intermediate flange preform in order to obtain the flange preform extending from the end of the body preform in the direction of extension and having the shape of the flange to be produced.

9. A method for manufacturing a composite material part comprising a body of complete revolution with an axis directed along an axial direction having one or more given reference radii, said body extending partially around the axial direction along a circumferential direction, and at least one flange extending from one end of the body along a direction of extension, the method comprising:

producing part sectors comprising a body sector of partial revolution with an axis directed along an axial direction having the given reference radius, said body sector extending partially around the axial direction along a circumferential direction, and at least one flange sector extending from one end of the body sector along a direction of extension, the manufacturing of said part sectors being carried out according to the manufacturing method of claim 6, assembling the part sectors to obtain the composite material part having a complete revolution.

10. The method according to claim 1, wherein the fabricating is performed by additive manufacturing, machining, or casting.

* * * * *